United States Patent
Yang

(10) Patent No.: US 11,855,533 B2
(45) Date of Patent: Dec. 26, 2023

(54) POWER SUPPLY DEVICE COMMUNICABLE WITH SYSTEM AND METHOD FOR SUPPLYING POWER TO SYSTEM THROUGH SWITCH THEREOF

(71) Applicant: Atemitech Corporation, Taoyuan (TW)

(72) Inventor: Shih-Hung Yang, Taipei (TW)

(73) Assignee: ATEMITECH CORPORATION, Taoyuan (TW)

(*) Notice: Subject to any disclaimer, the term of this patent is extended or adjusted under 35 U.S.C. 154(b) by 204 days.

(21) Appl. No.: 17/579,760

(22) Filed: Jan. 20, 2022

(65) Prior Publication Data
US 2023/0231475 A1    Jul. 20, 2023

(51) Int. Cl.
*H02M 1/10*    (2006.01)
*H02M 3/155*    (2006.01)
*H02M 1/36*    (2007.01)
*H02M 1/08*    (2006.01)
*H02M 1/00*    (2006.01)
*H02M 1/32*    (2007.01)

(52) U.S. Cl.
CPC .......... *H02M 3/155* (2013.01); *H02M 1/0006* (2021.05); *H02M 1/08* (2013.01); *H02M 1/10* (2013.01); *H02M 1/32* (2013.01); *H02M 1/36* (2013.01)

(58) Field of Classification Search
CPC .......... H02M 3/155; H02M 1/36; H02M 1/32; H02M 1/0006; H02M 1/10; G06F 1/263; H02H 1/00
See application file for complete search history.

(56) References Cited

U.S. PATENT DOCUMENTS

| | | | |
|---|---|---|---|
| 8,922,805 B2* | 12/2014 | Utsumi | H04N 1/00962 358/1.13 |
| 9,547,567 B2* | 1/2017 | Tanaka | G06F 1/30 |
| 2020/0189416 A1* | 6/2020 | Jung | G06F 8/65 |
| 2022/0286052 A1* | 9/2022 | Hsu | H02M 1/36 |
| 2022/0391188 A1* | 12/2022 | Sayyed | G06F 1/263 |

* cited by examiner

*Primary Examiner* — Kyle J Moody
*Assistant Examiner* — Jye-June Lee
(74) *Attorney, Agent, or Firm* — Locke Lord LLP; Tim Tingkang Xia, Esq.

(57) ABSTRACT

A power supply device communicable with a system and a method for supplying power to a system through a switch thereof are disclosed. The power supply device includes a switch, a microcontroller unit and a control circuit, and supplies power to the system through the switch. The microcontroller unit provides a first operating voltage to the switch through a first pin, and performs a firmware update procedure when the power supply device communicates with the system. The control circuit is coupled to the switch, and transmits a second operating voltage to the switch. When the microcontroller unit performs the firmware update procedure, the control circuit turns on the switch at least according to the second operating voltage, so that the power supply device does not stop supplying power to the system.

13 Claims, 4 Drawing Sheets

POWER SUPPLY DEVICE COMMUNICABLE WITH SYSTEM AND METHOD FOR SUPPLYING POWER TO SYSTEM THROUGH SWITCH THEREOF

BACKGROUND OF THE INVENTION

Field of the Invention

The present invention relates to a power supply device and, more particularly, to a power supply device communicable with a system and a method for supplying power to a system through a switch thereof.

Description of the Prior Art

A current power supply device is capable of supplying power to a system through a switch and includes a microcontroller unit capable of providing an operating voltage to turn on the switch. Furthermore, a current power supply device is also communicable with a system, which means that the microcontroller unit of the power supply device is signally connected to the system. However, a method for supplying power to a system by a power supply device communicable with a system through a switch is still in need of improvement.

SUMMARY OF THE INVENTION

To improve the drawbacks of the prior art, a power supply device communicable with a system is provided according to an embodiment of the present invention. The power supply device includes a switch, a microcontroller unit and a control circuit. The power supply device supplies power to a system through the switch. The microcontroller unit provides a first operating voltage to the switch through a first pin, and performs a firmware update procedure when the power supply device communicates with the system. The control circuit is coupled to the switch, and transmits a second operating voltage to the switch. When the microcontroller unit performs the firmware update procedure, the control circuit turns on the switch at least according to the second operating voltage.

A method for supplying power to a system through a switch is further provided according to an embodiment of the present invention. The method is suitable for a power supply device communicable with the system. The power supply device includes a switch and a microcontroller unit. The microcontroller unit provides a first operating voltage to the switch through a first pin. When the power supply device communicates with the system, the method includes: using a control circuit to transmit a second operating voltage to the switch; and the control circuit turning on the switch at least according to the second operating voltage when the microcontroller unit performs the firmware update procedure.

To further understand the features and technical contents of the present invention, the present invention is described in detail with the accompanying drawings below. It should be noted that the drawings are for reference and illustration purposes, and are not to be construed as limitations to the present invention.

DETAILED DESCRIPTION OF THE EMBODIMENTS

The implementation forms of the present invention are described by way of specific embodiments below for a person skilled in the art to understand the advantages and effects of the present invention on the basis of the disclosure of the present application. The present invention may also be implemented or applied in form of other different embodiments, and various modifications and changes may be made to the details in the present application on the basis of different perspectives and applications without departing from the spirit of the present invention. Moreover, the drawings are depicted for simple illustrations and may not be drawn to scale. Related technical contents of the present invention are described in detail in the embodiments below, and it should be noted that such description is not to be construed as limitations to the scope of legal protection of the present invention.

It should be understood that, the terms such as "first", "second" and "third" may be used herein to describe various elements or signals, and these elements or signals are however not limited by such terms. These terms are primarily for differentiating one element from another or one signal from another. Moreover, the term "or" used herein may include one or more combinations of the related enumerated items depending on the actual situation.

Figure 1:
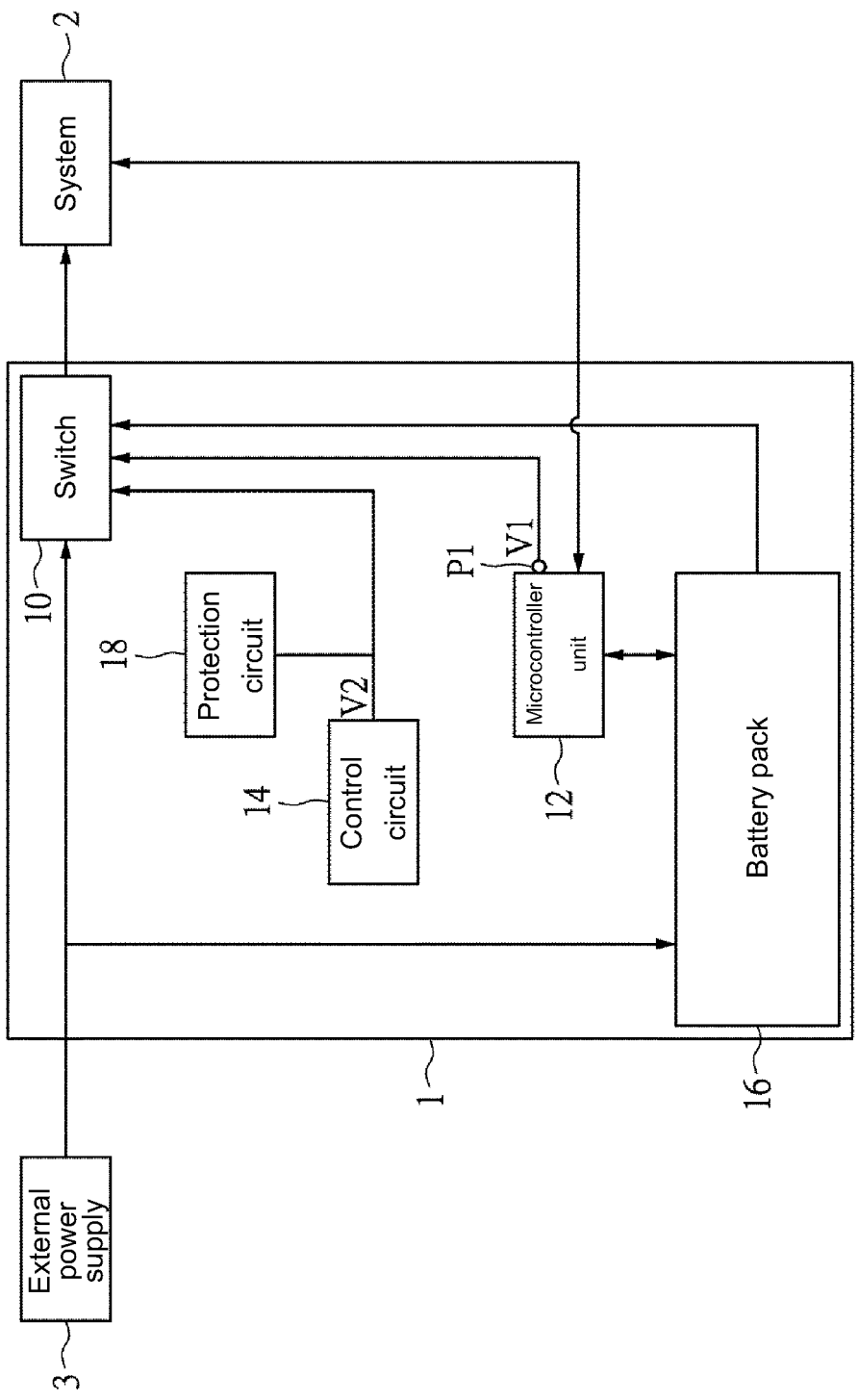
FIG. 1 is a function block diagram of a power supply device communicable with a system according to an embodiment of the present invention.

FIG. 1 shows a function block diagram of a power supply device communicable with a system according to an embodiment of the present invention. Referring to FIG. 1, a power supply device 1 includes a switch 10, a microcontroller unit 12 and a control circuit 14. The power supply device 1 supplies power to a system 2 through the switch 10 and is communicable with the system 2, meaning that the microcontroller unit 12 is signally connected to the system 2. However, the present invention does not define the specific implementation form of the communication between the power supply device 1 and the system 2, nor does the present invention define the specific implementation form of the microcontroller unit 12. In sum, the microcontroller unit 12 provides a first operating voltage V1 to the switch 10 through a first pin P1, and the microcontroller unit 12 may perform a firmware update procedure when the power supply device 1 communicates with the system 2. Moreover, power supplied by the power supply device 1 through the switch 10 to the system 2 may be provided by an external power supply 3 (for example, an alternating-current (AC) adaptor) or a battery pack 16 in the power supply device 1, but the present invention is not limited thereto. In other words, the power supply device 1 may be a backup battery unit (BBU), and the switch 10 is coupled to the external power supply 3 and the battery pack 16.

When the power supply device 1 is a BBU, the power supply device 1 may further charge the battery pack 16 through the external power supply 3, so that the power supply device 1 may switch to use the battery pack 16 to supply power to the system 2 through the switch 10 when the external power supply 3 is not available. However, operation principles of a BBU are generally known to a person skilled in the art, and such details are omitted herein for brevity. In sum, when the power supply device 1 is to supply power to the system 2, the microcontroller unit 12 provides the first operating voltage V1 through the first pin P1 to turn on the switch 10, and the power supply device 1 needs to continually supply power to the system 2 when the power supply device 1 communicates with the system 2. However, when the microcontroller unit 12 performs a firmware update procedure (for example, for updating firmware of the power supply device 1), an input/output pin (including the first pin P1) of the microcontroller unit 12 is transitioned to a high-impedance state for a brief moment, resulting in that the microcontroller unit 12 cannot continually provide the first operating voltage V1 in a stable manner through the first pin P1 and further fail to control turning on of the switch 10, or alternatively speaking, the switch 10 may be turned off, and that the power supply device 1 then stops supplying power to the system 2.

To solve the technical problem above, the control circuit 14 is coupled to the switch 10 and transmits a second operating voltage V2 to the switch 10, so that the control circuit 14 is enabled to turn on the switch 10 at least according to the second operating voltage V2 when the microcontroller unit 12 performs the firmware update procedure. In this case, the second operating voltage V2 transmitted by the control circuit 14 may be provided by the external power supply 3 or an internal circuit (for example, a low-dropout regulator (LDO), not shown in FIG. 1) of the power supply device 1 through a second pin P2 (not shown in FIG. 1). In other words, when the microcontroller unit 12 performs the firmware update procedure, the present invention may use a fixed voltage provided by the external power supply 3 or a 3.3/5 V voltage outputted by the LDO as another operating voltage for controlling the switch 10 to the second pin P2, and the switch 10 can then be turned on in conjunction with the control circuit 14, thus achieving the effect of avoiding the power supply device 1 from stopping supplying power to the system 2. Moreover, the power supply device 1 may further include a protection circuit 18 coupled to the control circuit 14. When the microcontroller unit 12 does not perform the firmware update procedure and the power supply device 1 is overloaded, the protection circuit 18 can at least change the second operating voltage V2 transmitted by the control circuit 14 to the switch 10, so as to turn off the switch 10 to stop the power supply device 1 from continually supplying power to the system 2.

Figure 2:
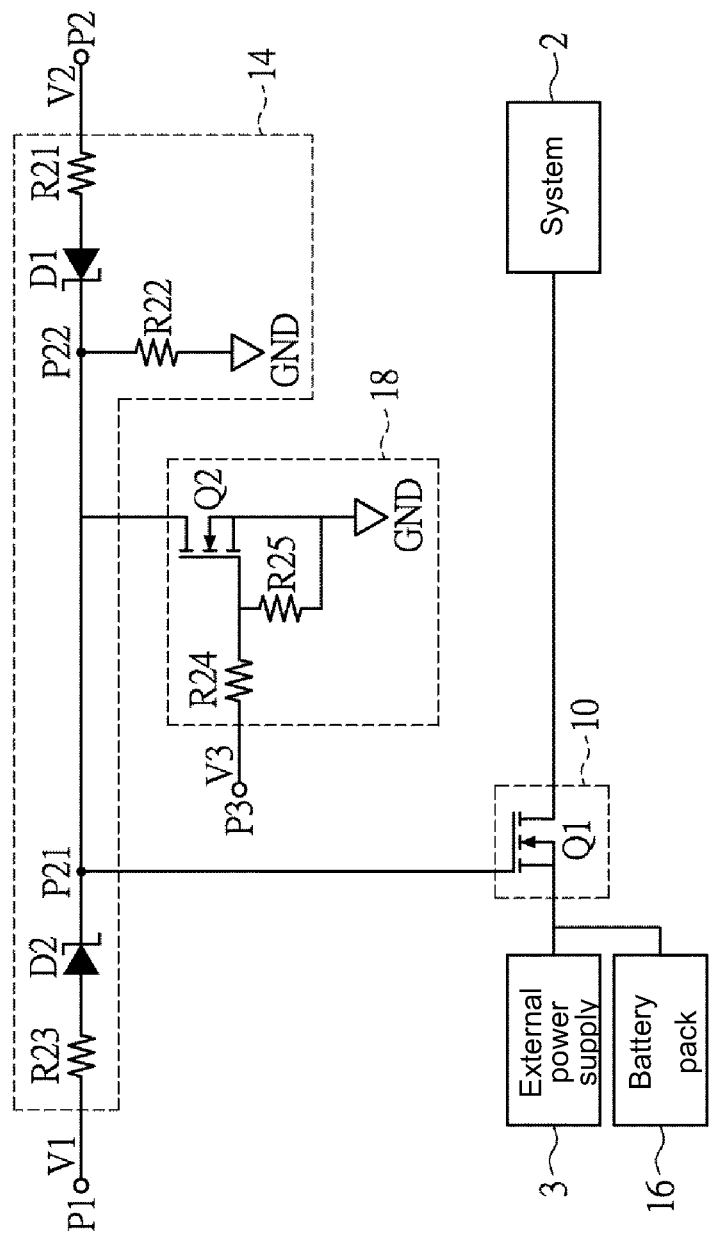
FIG. 2 is a schematic circuit diagram of the control circuit and the protection circuit in FIG. 1 according to a first embodiment.

However, because the switch 10 of the BBU may be a low-side N-type metal-oxide semiconductor field-effect transistor (N-MOSFET) or a high-side P-type metal-oxide semiconductor field-effect transistor (P-MOSFET), specific implementation forms of the control circuit 14 and the protection circuit 18 are described by different embodiments below. Referring to FIG. 2, FIG. 2 shows a schematic circuit diagram of the control circuit 14 and the protection circuit 18 in FIG. 1 according to a first embodiment. As shown in FIG. 2, when the switch 10 is a low-side N-MOSFET Q1, the gate of the low-side N-MOSFET Q1 is coupled to the control circuit 14 through a node P21, the source of the low-side N-MOSEFT Q1 is coupled to the external power supply 3 or the battery pack 16 of the power supply device 1, and the drain of the low-side N-MOSFET Q1 is coupled to the system 2. In this case, the control circuit 14 may include a resistor R21 and a resistor R22 for voltage dividing. The resistor R21 is coupled between the second pin P2 and the node P21, and one terminal of the resistor R21 is coupled to the node P21 through a node P22. Thus, the resistor R22 is coupled between the node P22 and a ground voltage GND, and is for performing voltage dividing in conjunction with the resistor R21.

As shown in FIG. 2, the gate of the low-side N-MOSFET Q1 is also coupled to the first pin P1 through the node P21. Thus, the control circuit 14 may further include a Schottky diode D1 and a Schottky diode D2. The Schottky diode D1 is coupled between the resistor R21 and the node P22, the anode of the Schottky diode D1 is coupled to the resistor R21, and the cathode of the Schottky diode D1 is coupled to the node P22. In other words, using the characteristic that the Schottky diode D1 blocks a reverse current, in this embodiment, a current flowing from the first pin P1 to the control circuit 14 may be prevented from flowing to the second pin P2. Similarly, the Schottky diode D2 is coupled between the first pin P1 and the node P21, the anode of the Schottky diode D2 is coupled to the first pin P1 through a resistor R23, and the cathode of the Schottky diode D2 is coupled to the node P21. Thus, using the characteristic that the Schottky diode D2 blocks a reverse current, in this embodiment, a current flowing from the second pin P2 to the control circuit 14 may be prevented from flowing to the first pin P1.

Moreover, the protection circuit 18 may include an N-MOSFET Q2. The gate of the N-MOSFET Q2 is coupled to a third pin P3 through a resistor R24, the source of the N-MOSFET Q2 is coupled to the ground voltage GND, and the drain of the N-MOSFET Q2 is coupled between the node P21 and the node P22. In this case, the protection circuit 18 may further include a resistor R25 coupled between the gate and the source of the N-MOSFET Q2. Thus, when the microcontroller unit 12 performs the firmware update procedure, the protection circuit 18 may turn off the N-MOSFET Q2 through the resistor R25. However, when the microcontroller unit 12 does not perform the firmware update procedure and the power supply device 1 is overloaded, the microcontroller unit 12 may provide a third operating voltage V3 through the third pin P3 to turn on the N-MOSFET Q2, so that the protection circuit 18 is enabled to at least change the second operating voltage V2 transmitted by the control circuit 14 to the low-side N-MOSFET Q1, to further turn off the low-side N-MOSFET Q1 to stop the power supply device 1 from continually supplying power to the system 2. Since operation principles of the N-MOSFET Q2 are generally known to a person skilled in the art, such details are omitted herein for brevity.

Figure 3:
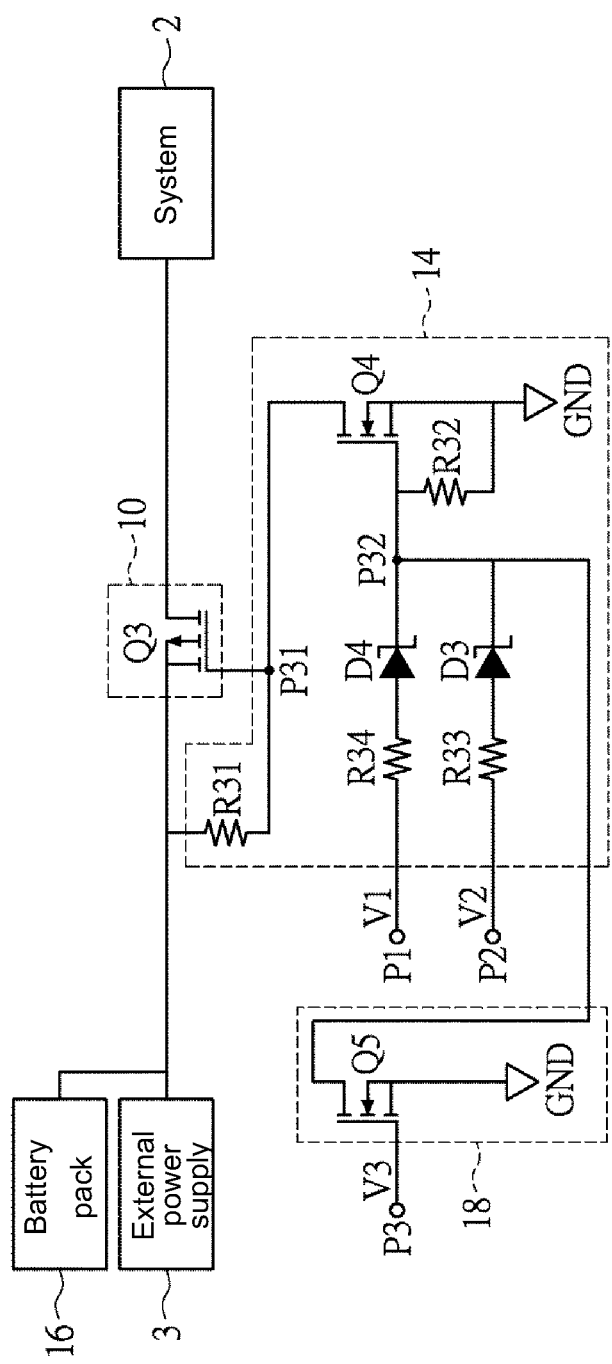
FIG. 3 is a schematic circuit diagram of the control circuit and the protection circuit in FIG. 1 according to a second embodiment.

Referring to FIG. 3, FIG. 3 shows a schematic circuit diagram of the control circuit 14 and the protection circuit 18 in FIG. 1 according to a second embodiment. As shown in FIG. 3, when the switch 10 is a high-side P-MOSFET Q3, the gate of the high-side P-MOSFET Q3 is coupled to the control circuit 14 through a node P31, the source of the high-side P-MOSFET Q3 is coupled to the external power supply 3 or the battery pack 16 of the power supply device 1, and the drain of the high-side P-MOSFET Q3 is coupled to the system 2. In this case, the control circuit 14 may include a resistor R31, an N-MOSFET Q4 and a resistor R32. The resistor R31 is coupled between the source of the high-side P-MOSFET Q3 and the node P31. The gate of the N-MOSFET Q4 is coupled to the first pin P1 and the second pin P2 through a node P32, the source of the N-MOSFET Q4 is coupled to the ground voltage GND, and the drain of the N-MOSFET Q4 is coupled to the node P31. The resistor R32 is coupled between the gate and the source of the N-MOSFET Q4.

In other words, because the switch 10 is the high-side P-MOSFET Q3, reverse control is further performed by the N-MOSFET Q4 in this embodiment. Since operation principles of the N-MOSFET Q4 are generally known to a person skilled in the art, the associated details are omitted herein for brevity. Similarly, the control circuit 14 in FIG. 3 may further include a Schottky diode D3 and a Schottky diode D4. The Schottky diode D3 is coupled between the second pin P2 and the node P32, the anode of the Schottky diode D3 is coupled to the second pin P2 through a resistor R33, and the cathode of the Schottky diode D3 is coupled to the node P32. Thus, using the characteristic that the Schottky diode D3 blocks a reverse current, in this embodiment, a current flowing from the first pin P1 to the control circuit 14 may be prevented from flowing to the second pin P2. Moreover, the Schottky diode D4 is coupled between the first pin P1 and the node P32, the anode of the Schottky diode D4 is coupled to the first pin P1 through a resistor R34, and the cathode of the Schottky diode D4 is coupled to the node P32. Thus, using the characteristic that the Schottky diode D4 blocks a reverse current, in this embodiment, a current flowing from the second pin P2 to the control circuit 14 may be prevented from flowing to the first pin P1.

Figure 4:
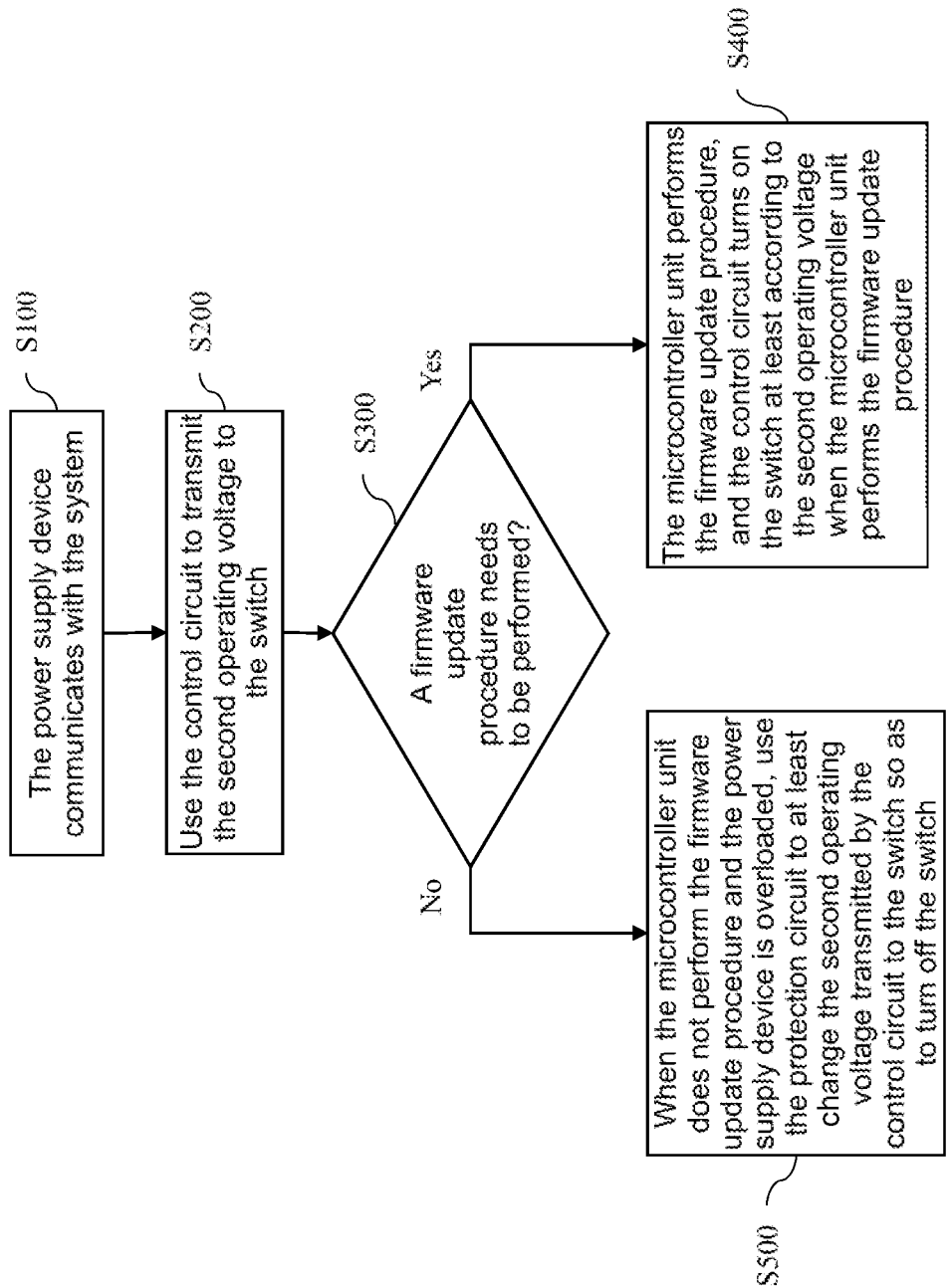
FIG. 4 is a flowchart of steps of a method for supplying power to a system through a switch according to an embodiment of the present invention.

In addition, compared to the protection circuit 18 in FIG. 2, the protection circuit 18 in FIG. 3 may include an N-MOSFET Q5. The gate of the N-MOSFET Q5 is coupled to the third pin P3, the source of the N-MOSFET Q5 is coupled to the ground voltage GND, and the drain of the N-MOSFET Q5 is coupled to the node P32. As previously described, the microcontroller unit 12 may provide the third operating voltage V3 through the third pin P3 to turn on the N-MOSFET Q5. In other embodiments, the protection circuit 18 in FIG. 3 may be replaced by the protection circuit 18 in FIG. 2. Since the associated details are the same as those given in the description of the foregoing embodiment, such repeated details are omitted herein for brevity. Referring to FIG. 4, FIG. 4 shows a flowchart of steps of a method for supplying power to a system through a switch according to an embodiment of the present invention.

Also referring to FIG. 1 for better understanding, the method in FIG. 4 is suitable for the power supply device 1 in FIG. 1; however, the present invention does not define that the method in FIG. 4 is only suitable for the power supply device 1 in FIG. 1. As shown in FIG. 4, in step S100, the power supply device 1 communicates with the system 2. When the power supply device 1 communicates with the system 2, the power supply device 1 performs step S200 so as to use the control circuit 14 to transmit the second operating voltage V2 to the switch 10. Next, in step S300, the microcontroller unit 12 determines whether the power supply device 1 needs to perform a firmware update procedure. When the power supply device 1 needs to perform the firmware update procedure, the power supply device 1 performs step S400. In step S400, the microcontroller unit 12 performs the firmware update procedure, and the control circuit 14 turns on the switch 10 at least according to the second operating voltage V2 when the microcontroller unit 12 performs the firmware update procedure. In contrast, when the power supply device 1 does not need to perform the firmware update procedure, the power supply device 1 performs step S500. In step S500, when the microcontroller unit 12 does not perform the firmware update procedure and the power supply device 1 is overloaded, the power supply device 1 uses the protection circuit 18 to at least change the second operating voltage V2 transmitted by the control circuit 14 to the switch 10, so as to turn off the switch 10 to stop the power supply device 1 from continually supplying power to the system 2. The associated details are as those given in the description above, and such repeated details are omitted herein for brevity.

In conclusion, a power supply device communicable with a system and a method for supplying power to a system through a switch thereof are provided according to the embodiments of the present invention. The power supply device includes a control circuit coupled to the switch, and the control circuit transmits another operating voltage to the switch. Thus, when a microcontroller unit of the power supply device performs a firmware update procedure, the control circuit can turn on the switch at least according to the another operating voltage. Therefore, the present invention solves the technical problem that a power supply device may stop supplying power to a system when a microcontroller unit fails to turn on a switch caused by the transition to a high-impedance state of an input/output pin.

The disclosure above describes merely preferred feasible embodiments of the present invention and is not to be construed as limitations to the scope of claims of the present invention. It should be noted that all equivalent technical modifications made on the basis of the description and drawings of the present invention are encompassed within the scope of the appended claims of the present invention.

What is claimed is:

1. A power supply device communicable with a system, the power supply device comprising:
 a switch, through which the power supply device supplies power to the system;
 a microcontroller unit, providing a first operating voltage to the switch through a first pin, the microcontroller unit performs a firmware update procedure when the power supply device communicates with the system; and
 a control circuit, coupled to the switch, transmitting a second operating voltage to the switch, the control circuit turning on the switch at least according to the second operating voltage when the microcontroller unit performs the firmware update procedure.

2. The power supply device of claim 1, wherein the second operating voltage is provided by an external power supply or an internal circuit of the power supply device through a second pin.

3. The power supply device of claim 2, further comprising:
 a protection circuit, coupled to the control circuit, the protection circuit at least changing the second operating voltage transmitted by the control circuit to the switch when the microcontroller unit does not perform the firmware update procedure and the power supply device is overloaded, so as to turn off the switch to stop the power supply device from continually supplying power to the system.

4. The power supply device of claim 3, wherein the switch is a low-side N-type metal-oxide semiconductor field-effect transistor (N-MOSFET), a gate of the low-side N-MOSFET is coupled to the control circuit through a first node, a source of the low-side N-MOSFET is coupled to the external power supply or a battery pack of the power supply device, and a drain of the low-side N-MOSFET is coupled to the system.

5. The power supply device of claim 4, wherein the control circuit comprises:
 a first resistor, coupled between the second pin and the first node, wherein one terminal of the first resistor is coupled to the first node through a second node; and
 a second resistor, coupled between the second node and a ground voltage.

6. The power supply device of claim 5, wherein the control circuit further comprises:
  a first Schottky diode, coupled between the first resistor and the second node, wherein an anode of the first Schottky diode is coupled to the first resistor, and a cathode of the first Schottky diode is coupled to the second node; and
  a second Schottky diode, coupled between the first pin and the first node, wherein an anode of the second Schottky diode is coupled to the first pin through a third resistor, and a cathode of the second Schottky diode is coupled to the first node.

7. The power supply device of claim 6, wherein the protection circuit comprises:
  a N-MOSFET, wherein a gate of the N-MOSFET is coupled to a third pin through a fourth resistor, a source of the N-MOSFET is coupled to the ground voltage, and a drain of the N-MOSFET is coupled between the first node and the second node, and wherein the microcontroller unit provides a third operating voltage to the N-MOSFET through the third pin; and
  a fifth resistor, coupled between the gate of the N-MOSFET and the source of the N-MOSFET, the fifth resistor turning off the N-MOSFET when the microcontroller unit performs the firmware update procedure.

8. The power supply device of claim 3, wherein the switch is a high-side P-type MOSFET (P-MOSFET), a gate of the high-side P-MOSFET is coupled to the control circuit through a first node, a source of the high-side P-MOSFET is coupled to the external power supply or a battery pack of the power supply device, and a drain of the high-side P-MOSFET is coupled to the system.

9. The power supply device of claim 8, wherein the control circuit comprises:
  a first resistor, coupled between the source of the high-side P-MOSFET and the first node;
  a first N-MOSFET, wherein a gate of the first N-MOSFET is coupled to the first pin and the second pin through a second node, a source of the first N-MOSFET is coupled to a ground voltage, and a drain of the first N-MOSFET is coupled to the first node; and
  a second resistor, coupled between the gate of the first N-MOSFET and the source of the first N-MOSFET.

10. The power supply device of claim 9, wherein the control circuit further comprises:
  a first Schottky diode, coupled between the second pin and the second node, wherein an anode of the first Schottky diode is coupled to the second pin through a third resistor, and a cathode of the first Schottky diode is coupled to the second node; and
  a second Schottky diode, coupled between the first pin and the second node, wherein an anode of the second Schottky diode is coupled to the first pin through a fourth resistor, and a cathode of the second Schottky diode is coupled to the second node.

11. The power supply device of claim 10, wherein the protection circuit comprises:
  a second N-MOSFET, wherein a gate of the second N-MOSFET is coupled to a third pin, a source of the second N-MOSFET is coupled to the ground voltage, and a drain of the second N-MOSFET is coupled to the second node, and wherein the microcontroller unit provides a third operating voltage to the second N-MOSFET through the third pin.

12. A method for supplying power to a system through a switch, suitable for a power supply device communicable with the system, the power supply device comprising the switch and a microcontroller unit, the microcontroller unit providing a first operating voltage to the switch through a first pin; the microcontroller unit performs a firmware update procedure when the power supply device communicates with the system, the method comprising: using a control circuit to transmit a second operating voltage to the switch, and the control circuit turning on the switch at least according to the second operating voltage when the microcontroller unit performs the firmware update procedure.

13. The method according to claim 12, further comprising:
  when the microcontroller unit does not perform the firmware update procedure and the power supply device is overloaded, using a protection circuit to at least change the second operating voltage transmitted by the control circuit to the switch so as to turn off the switch.

* * * * *